UNITED STATES PATENT OFFICE.

HENRY PHELPS GAGE, OF CORNING, NEW YORK, ASSIGNOR TO CORNING GLASS WORKS, A CORPORATION OF NEW YORK.

GLASS.

1,295,298.  Specification of Letters Patent.  Patented Feb. 25, 1919.

No Drawing.  Application filed July 21, 1916.  Serial No. 110,511.

*To all whom it may concern:*

Be it known that I, HENRY PHELPS GAGE, a citizen of the United States of America, and a resident of Corning, New York, have invented certain new and useful Improvements in Glass, of which the following is a specification.

It has been heretofore proposed to add salts of nickel and copper to a basic potash lime glass to produce by light transmitted therethrough from an artificial source the effects of daylight. I have found, however, that such a basic glass is objectionable as a carrier for the nickel in connection with certain artificial light sources, in that it results in too much absorption in the blue end of the spectrum. I have found further that by a suitable modification of the glass composition a greater transmission can be obtained at this end. This is of importance, as light from artificial sources is generally deficient in the shorter wave lengths as compared with sun-light.

Generally speaking, my invention therefore consists in the use of an acid boro-silicate glass as the material in which the nickel and copper is to be carried, instead of the basic potash lime glass of the prior art. As illustration of a suitable glass composition, I will state that I have used with advantage a glass batch consisting of 32 parts pearlash (83% $K_2CO_3$), 14 parts boric acid $B(OH)_3$, 72 parts silica ($SiO_2$) and 4 parts saltpeter ($KNO_3$).

To a batch of the above composition is added and thoroughly mixed .3 of 1% of cupric oxid (CuO) and .065 of 1% of nickel oxid (NiO). When this mixture is suitably melted, it can be worked by ordinary processes, and when of suitable thickness, a much closer approximation to daylight is obtained in the light transmitted therethrough from a tungsten filament lamp, than is obtained by a potash lime or a potash lead glass containing nickel combined with copper.

The resultant glass heretofore described is intended to use for producing artificial illumination simulating in its spectral distribution of energy, the spectrum of daylight.

Having thus described my invention, what I claim and desire to secure by Letters Patent is,—

1. A potash boro-silicate glass for use as a filter to produce daylight effects, containing copper and nickel.
2. A boro-silicate glass for use as a filter to produce daylight effects, containing copper and nickel and substantially free from soda.
3. A boro-silicate glass for use as a filter to produce daylight effects, containing copper and nickel and substantially free from soda in substantially the proportions specified.

In testimony whereof I have signed my name this 18 day of July 1916.

HENRY PHELPS GAGE.

In the presence of—
AMBROSE J. HAAR,
S. J. MAYER.